(12) United States Patent
Grogan et al.

(10) Patent No.: US 7,530,688 B2
(45) Date of Patent: May 12, 2009

(54) DECORATIVE MAGNETIC ATTACHMENTS TO ENHANCE EYEWEAR

(75) Inventors: Thomas Grogan, Folsom, CA (US); Melissa Blais, El Dorado Hills, CA (US)

(73) Assignee: Altair Eyewear, Inc., Rancho Cordova, CA (US)

( * ) Notice: Subject to any disclaimer, the term of this patent is extended or adjusted under 35 U.S.C. 154(b) by 0 days.

(21) Appl. No.: 12/082,297

(22) Filed: Apr. 10, 2008

(65) Prior Publication Data

US 2008/0259269 A1    Oct. 23, 2008

Related U.S. Application Data

(60) Provisional application No. 60/925,198, filed on Apr. 19, 2007.

(51) Int. Cl.
*G02C 11/02* (2006.01)
(52) U.S. Cl. .................. 351/52; 351/51; 351/121
(58) Field of Classification Search .......... 351/51, 351/52, 158, 41, 111, 121; 63/29.1
See application file for complete search history.

(56) References Cited

U.S. PATENT DOCUMENTS

| 2,752,764 | A | * | 7/1956 | Lederer | ............... 63/29.1 |
| 5,786,880 | A | | 7/1998 | Chao | |
| 6,412,942 | B1 | | 7/2002 | Mckenna | |
| 6,783,238 | B1 | | 8/2004 | Stepper | |
| 7,261,409 | B1 | * | 8/2007 | Taber et al. | ............ 351/52 |

OTHER PUBLICATIONS

Toy Fair Times, Feb. 14, 2006, p. 10, article on lower left.
Photgrapgh in advertisment of in.dear.rings, date unkown.

* cited by examiner

*Primary Examiner*—Hung X Dang

(57) ABSTRACT

Decorative elements magnetically attachable to, removable from and/or interchangeable with eyewear frames comprise decorative element mounting means having a recess for receiving a magnet and cooperating with a recess on the eyewear frame which receives the mounting means. The two recesses are generally opposed in direction such that the recess on the mounting means and the magnet therein are both received internally by the recess on the eyewear frame with the magnet being sufficiently close to the internal metal or wire reinforcement of the frame to be attracted thereto.

1 Claim, 3 Drawing Sheets

DECORATIVE MAGNETIC ATTACHMENTS TO ENHANCE EYEWEAR

REFERENCE TO RELATED APPLICATION

Reference is made to provisional Patent Application No. 60/925,198, filed Apr. 19, 2007, the benefit of which is hereby claimed pursuant to 35 U.S.C §120.

FIELD OF THE INVENTION

Decorative eyewear.

BACKGROUND OF THE INVENTION

The functional aspects of eyewear, optical correction and/or protection, frequently are accompanied by aspects esthetics as indicated by the many variations in eyewear styles. The present invention provides means to vary the appearance or decoration of a given eyewear frame.

BRIEF SUMMARY OF THE INVENTION

Means are provided for removably and interchangeably attaching decorative elements or embellishments to eyewear frames. The means comprise facing opposed mating recesses, at least one recess in the eyewear frame at the location or locations at which the decorative embellishment is desired and a recess in a removable mount for the decorative element. The frame recess is adapted to receive at least part of the removable mount with the recess in the mount facing inwardly of the frame recess. The recess in the mount is adapted to receive a magnet which is attracted to the metal or wire member of the eyewear frame. Any surface of the removable mount not facing inwardly of the eyewear frame is adapted to receive decorative elements.

DETAILED DESCRIPTION OF THE INVENTION

Figure 1:
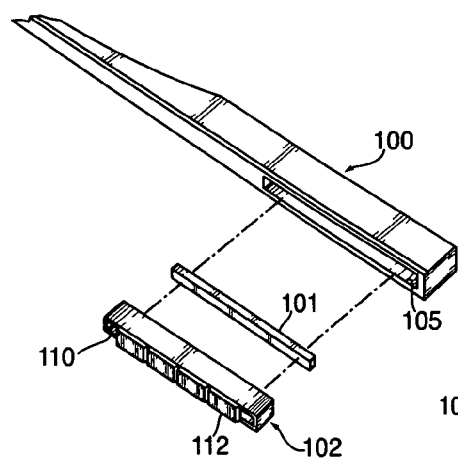
FIG. 1 is an exploded perspective view of a portion of an eyewear frame temple member showing the recess therein, the removable mount and the magnet.
Figure 4:
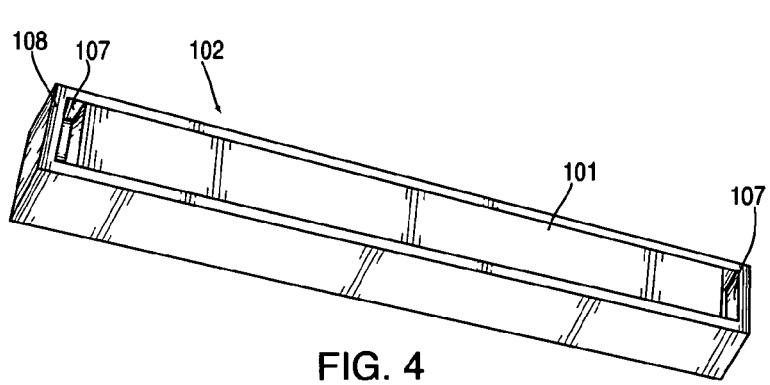
FIG. 4 is a rear perspective view of the decorative element on the rearward face of the removable mount showing the recess and magnet therein.
Figure 2:
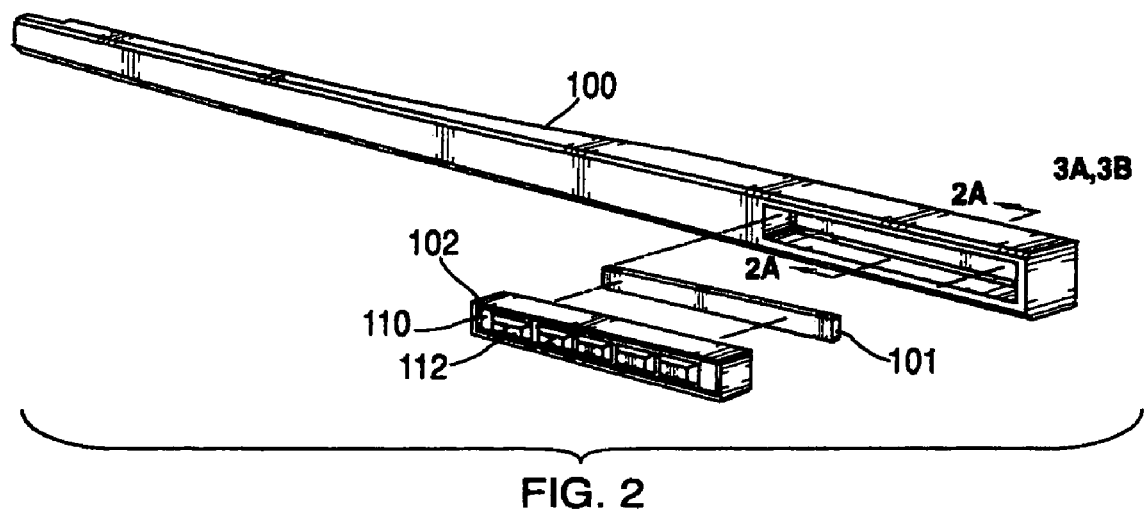
FIG. 2 is an exploded view similar to that of FIG. 1 but at a different perspective angle.
Figure 2A:
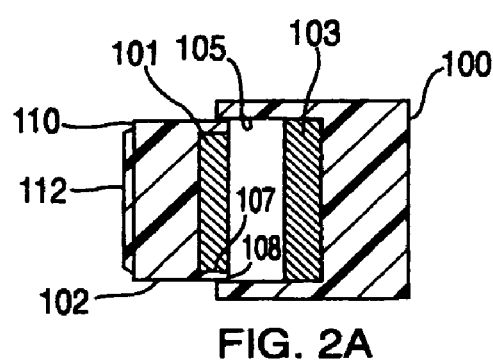
FIG. 2(A) is a cross-sectional view taken along line 2(A)-2(A) of FIG. 2 and additionally showing in cross-section the removable mount positioned for insertion into the frame recess.
Figure 2B:
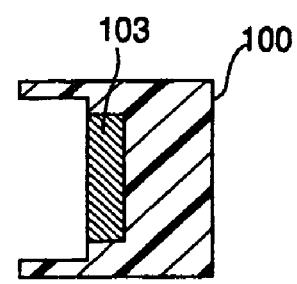
FIG. 2(B) is a cross-sectional view taken along line 2(A)-2(A) of FIG. 2 but for a different typical material than that shown in FIG. 2(A).
Figure 3:
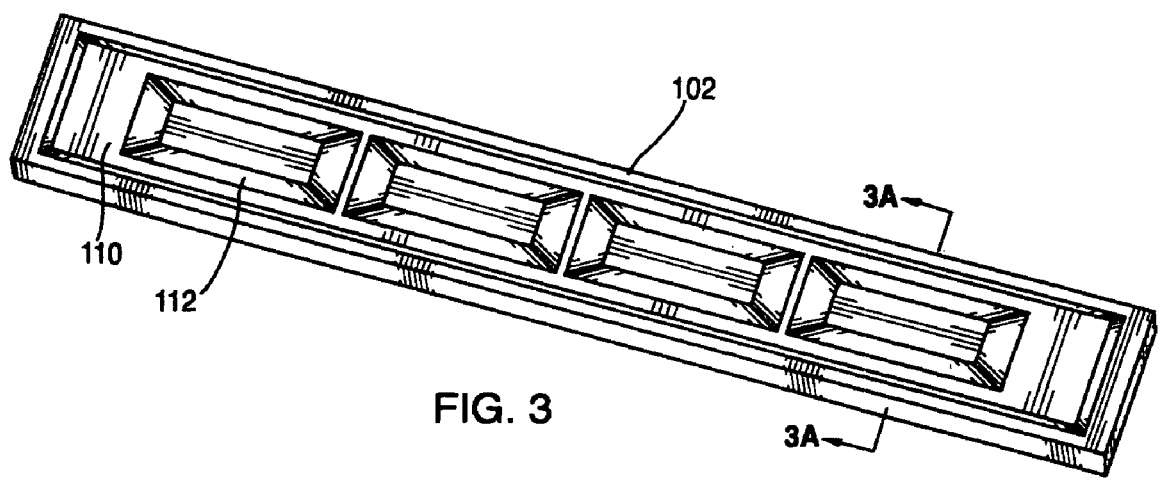
FIG. 3 is a front perspective view of the decorative element on the outward face of the removable mount.
Figure 3A:
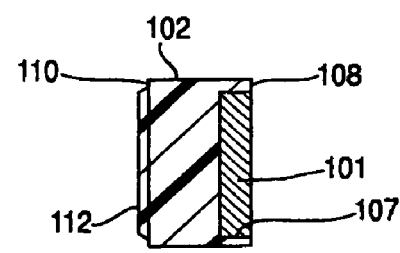
FIG. 3(A) is a cross-sectional view taken along line 3(A)-3(A) of FIG. 3.

With reference to the drawing, an eyewear frame temple 100 is provided with at least one outwardly facing frame recess 105 formed therein. A removable mount 102 has a recess 107 provided in the back surface 108 thereof adapted to receive a magnet 101 affixed therein. The relative dimensions of frame recess 105 and of mount 102 are that the frame recess is large enough to receive therein at least the back 108 of mount 102 with mount recess 107 and magnet 101 therein facing oppositely and received inwardly of frame recess 105.

The front surface 110 of mount 102 is adapted to receive or incorporate a decorative element 112 which, when mount 102 is inserted (mounted) into frame recess 105, faces outwardly of the frame and forms an esthetically visible portion of the appearance of the frame. By removal of one mount 102 from frame 100 and replacement of another mount 102 having different decorative element 112, the visual appearance of frame temple 100 may be altered.

Eyewear frame temple 100 typically has an imbedded metal or wire reinforcement member 103 which, preferably of ferrous material, is magnetically attracted by magnet 101. As frame recess 105 allows magnet 101 to come close to metal member 103, the magnetic attraction is sufficient to hold mount 102 in place until manually removed, whereby mount 102 with decorative element 112 may be exchanged for a different decorative element and accordingly different appearance.

What is claimed is:

1. Eyewear having means for interchangeable decorative embellishments, said means comprising:
   a. eyewear frame temple means, said eyewear frame temple means comprising at least one frame recess formed therein and facing outwardly of said eyewear and further comprising magnetically-sensitive means, and
   b. removable mount means, said removable mount means having a back surface with at least one mount recess formed therein and adapted to receive attachment means, and a front surface adapted for decorative embellishment,
   c. said frame recess being dimensioned sufficiently to receive therein at least said back surface of said removable mount means, said mount recess and said attachment means facing oppositely and inwardly of said frame recess and said mount recess and said attachment means being received internally of said frame recess when mounted,
   d. said attachment means removably attaching said removable mount means to said eyewear frame temple means,
   e. whereby the appearance of said eyewear frame temple means may be changeably embellished.

* * * * *